United States Patent [19]

Heller

[11] 3,849,680
[45] Nov. 19, 1974

[54] LIQUID COOLED ROTOR FOR DYNAMOELECTRIC MACHINES

[75] Inventor: Paul R. Heller, Murrysville, Pa.

[73] Assignee: Westinghouse Electric Corporation, Pittsburgh, Pa.

[22] Filed: Jan. 24, 1974

[21] Appl. No.: 436,284

[52] U.S. Cl. .................................. 310/54, 310/61
[51] Int. Cl. .......................................... H02k 9/00
[58] Field of Search ............ 310/52, 58, 54, 59, 61, 310/64, 65, 215, 214, 217, 218, 261, 264, 266, 265

[56] References Cited
UNITED STATES PATENTS

| | | | |
|---|---|---|---|
| 2,497,736 | 2/1970 | Cuny | 310/54 |
| 2,749,457 | 6/1956 | Kilner | 310/64 |
| 3,497,243 | 12/1969 | Wiedemann | 310/54 |
| 3,622,820 | 11/1971 | Tjernstrom | 310/54 |
| 3,733,502 | 5/1973 | Curtis | 310/61 |

Primary Examiner—R. Skudy
Attorney, Agent, or Firm—G. H. Telfer

[57] ABSTRACT

A liquid cooled rotor is provided for machines such as large turbine generators in which provision is made for draining off and collecting any leakage of coolant liquid that may occur in such a manner that the possibility of damage is avoided. This is accomplished by draining any leakage liquid through passages in the slots to the end of the rotor where it is discharged from the rotor and collected.

10 Claims, 6 Drawing Figures

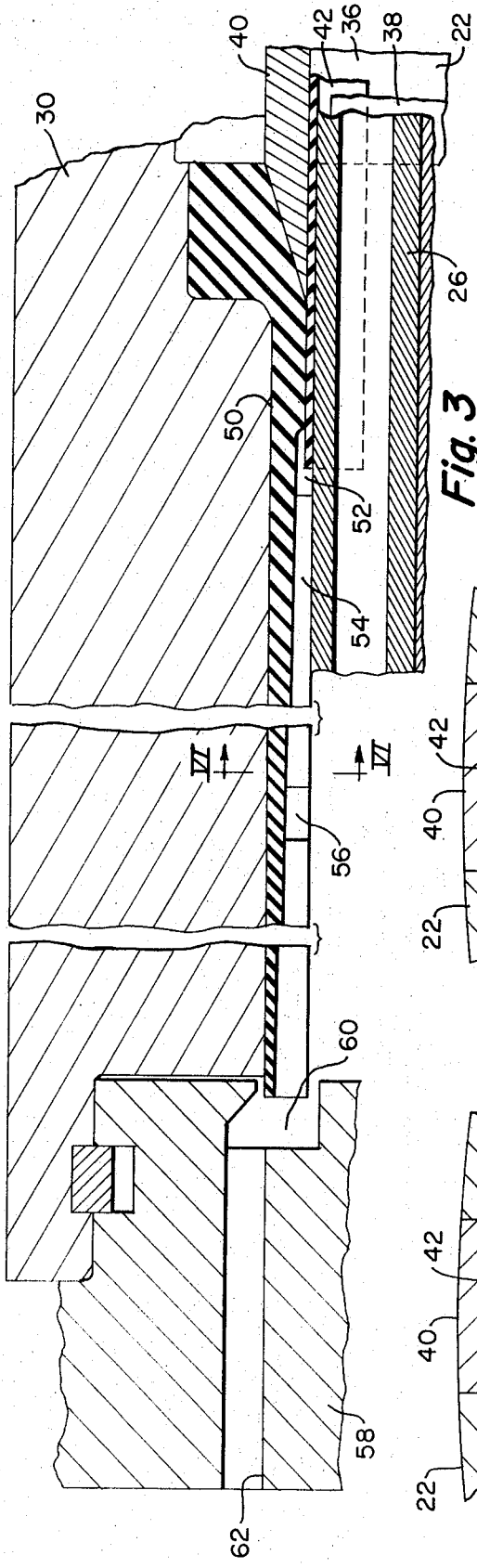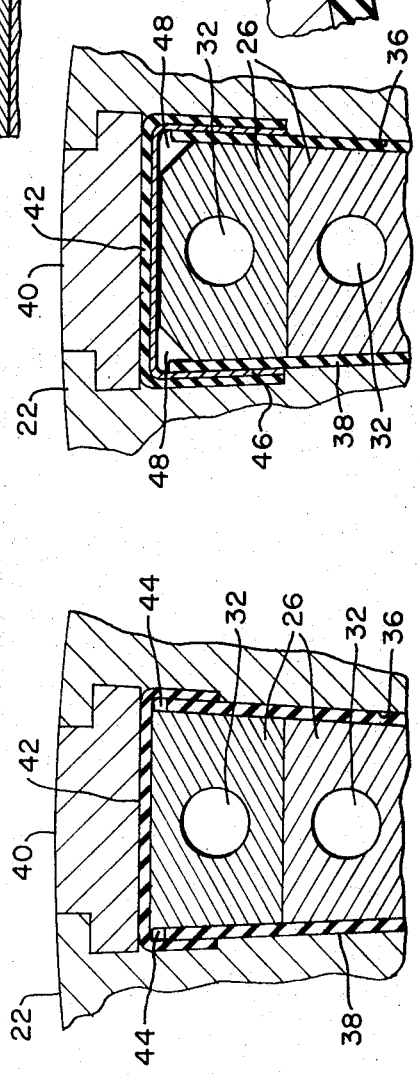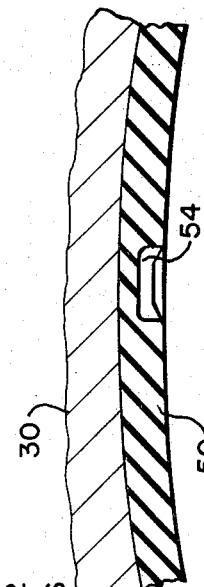

3,849,680

LIQUID COOLED ROTOR FOR DYNAMOELECTRIC MACHINES

BACKGROUND OF THE INVENTION

The present invention relates to liquid cooled rotors for dynamoelectric machines such as large turbine generators, and more particularly to means for controlling any possible leakage of coolant liquid in a manner to prevent any damage to the machine.

Large turbine generators are usually of the inner-cooled, or direct-cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum ratings obtainable in large generators. The coolant used in these machines has usually been hydrogen which fills the gas-tight housing and is circulated through the ducts of the stator and rotor windings and through radial or axial ducts in the stator core. As the maximum ratings of these large generators have continued to increase, however, further substantial improvements in cooling are necessary and can be obtained by the use of more efficient coolant fluids such as liquids. This has been done in stators by circulating a liquid coolant, such as water, through the ducts of the stator winding, with a very considerable improvement in cooling. A substantial further improvement can be obtained by also utilizing liquid cooling for the rotor by circulating a coolant liquid through passages in the rotor windings.

In such rotors, the windings are cooled by circulating the liquid coolant, preferably water, through hollow winding conductors or through ducts or tubing embedded in the conductors in direct thermal relation therewith. The water is supplied to and discharged from the individual conductors through numerous insulated connecting hoses, hydraulic connectors, tubes and conduits of various types. The water tubes and connections are necessarily located at or near the periphery of the rotor, and during operation at high speed the hydraulic pressures due to centrifugal forces are of the order of several thousand pounds per square inch. All components of the hydraulic system, and especially the joints, must be designed and manufactured so as to be capable of withstanding these pressures under cyclical loading and deflection without failure or leakage throughout the life of the machine. It is apparent that this presents a difficult manufacturing problem, and since a large number of joints are necessarily required on a large rotor, there is some probability that even with the exercise of every precaution during manufacture an occasional leak may occur.

Such leaks occurring during operation of the machine can be extremely serious. If a leak should occur on the rotor while it is rotating at normal operating speed, a high pressure jet of water would be emitted from the rotor with high velocity. Such a jet could seriously erode the stator core if it impinged on the core, or could cut through the high voltage stator winding insulation, resulting in a catastrophic failure. Even a less serious leak could result in accumulation of moisture and/or vapor in a manner which might produce stress corrosion of large rotor forgings and retaining rings, or other damage, requiring a prolonged outage of the machine for repair. It is highly desirable, therefore, to provide means in large, liquid cooled rotors for draining off any leakage to a noncritical location so that the leakage can be collected and disposed of without causing damage to the machine.

SUMMARY OF THE INVENTION

In accordance with the present invention, a water cooled rotor is provided which has provision for collecting any leakage that may occur anywhere in the hydraulic system, and draining the leakage liquid to the end of the rotor where it is discharged to the stator in such a manner that it can be collected and disposed of without causing any damage to the machine.

More specifically, the invention provides a water cooled rotor having winding conductors disposed in longitudinal slots in the usual manner, and having passages in each slot in which any leakage of water can accumulate and flow to one end of the rotor body. The retaining ring at the end of the rotor, which may be of usual design, includes means such as an annular groove for collecting leakage flowing through the passages in any of the slots and grooves for conveying it to the end of the rotor. Additional grooves may be provided in the retaining ring for insuring that any leakage occurring in the end turn portions of the winding is similarly collected. At the end of the retaining ring a trough or groove is provided in the end plate in which the leakage is collected, and discharge holes are provided through which the liquid is discharged as a fine spray which can be collected by suitable means such as a generally circular baffle encircling the end of the rotor. Any leakage thus collected can readily be drained off to a part of the stator housing where its presence can be detected and it can be drained or otherwise disposed of.

BRIEF DESCRIPTION OF THE DRAWINGS

The invention will be more fully understood from the following detailed description, taken in connection with the accompanying drawings, in which:

FIG. 3 is a fragmentary longitudinal sectional view, on a still larger scale, showing the end of the rotor;

FIG. 4 is a fragmentary transverse sectional view approximately on the line IV—IV of FIG. 2 showing one winding slot;

FIG. 5 is a transverse sectional view similar to FIG. 4 but showing a somewhat modified construction; and FIG. 6 is a fragmentary transverse sectional view substantially on the line VI—VI of FIG. 2.

DESCRIPTION OF THE PREFERRED EMBODIMENT

Figure 2:
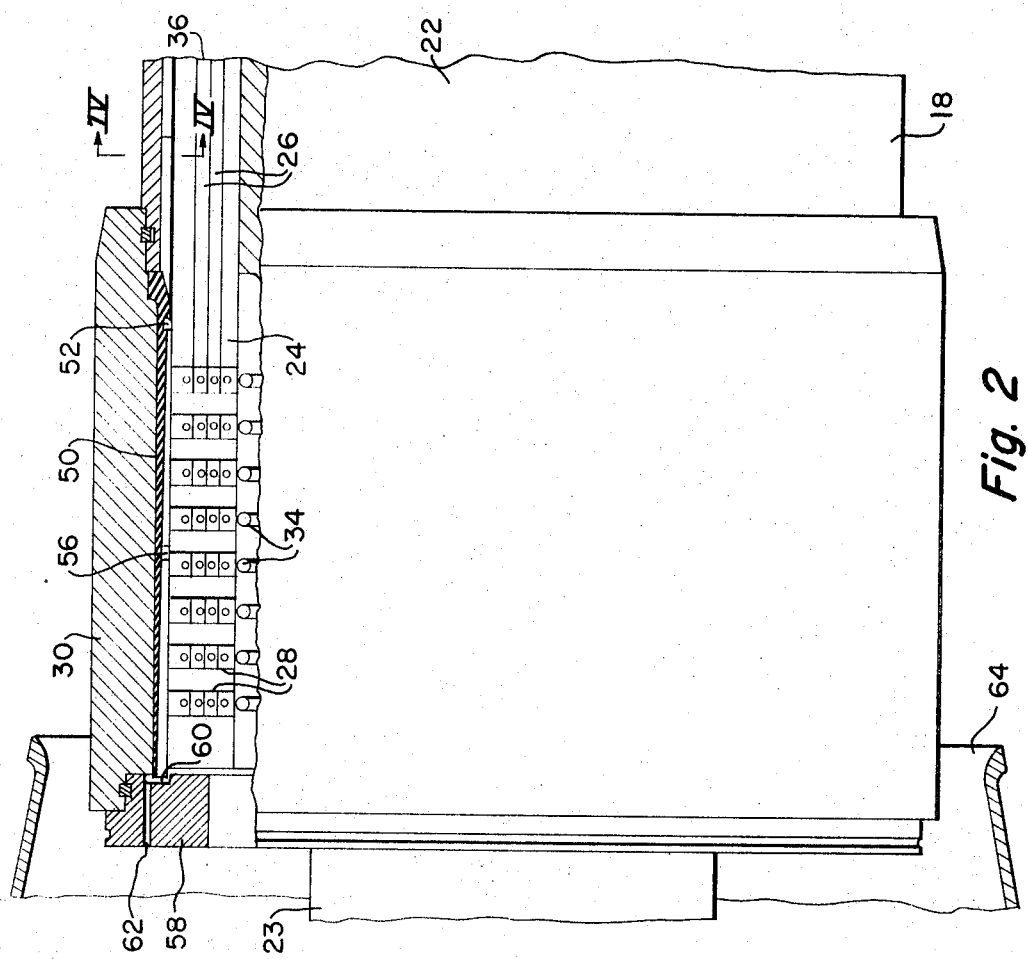
FIG. 2 is an enlarged view, partly in longitudinal section, showing one end of the liquid cooled rotor.

The invention is shown in the drawings embodied in a liquid cooled rotor for use in a large turbine generator of typical construction, although it should be understood that the rotor of the present invention may be used in any desired type of dynamoelectric machine.

Figure 1:
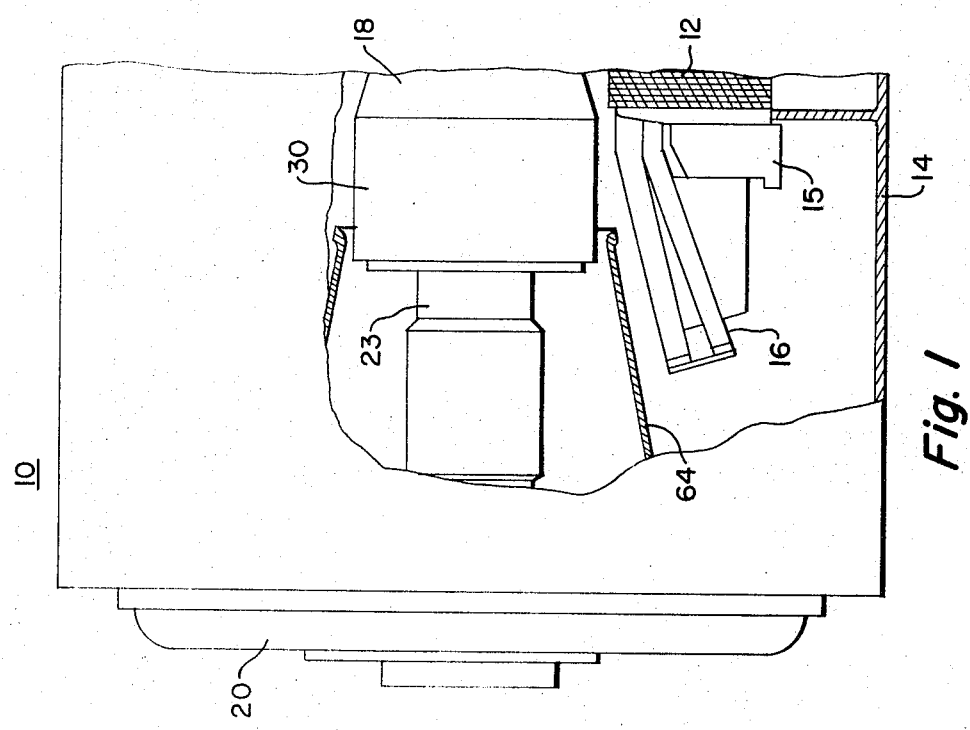
FIG. 1 is a side elevation, partly broken away, of one end of a large turbine generator having a liquid cooled rotor embodying the invention.

Referring first to FIG. 1, there is shown a large generator 10 which has a stator core 12 supported in a substantially gas-tight outer housing 14. The core 12 is of the usual laminated construction having a generally cylindrical bore therethrough, and the laminations are lcamped between suitable end plates 15 in the usual manner. The stator core 12 has longitudinal slots in its inner periphery for the reception of a stator winding 16 which may be of any suitable or usual type. The housing 14 is filled with a coolant gas, preferably hydrogen, which is circulated through the interior of the housing in the usual manner, and suitable baffling of any desired type may be provided in the housing to direct the flow of gas therein.

The machine has a rotor 18 which is disposed in the bore of the stator core 12 and supported in the end brackets 20 at each end of the housing 14 in bearing assemblies of any desired type, which may include gland seals to prevent leakage of gas from the housing.

As shown more particularly in FIG. 2, the rotor 18 has a body portion 22 and shaft portions 23 integral therewith and extending axially from each end of th body portion. The body portion 22 is provided with peripheral slots in the usual manner for reception of a rotor winding 24. The rotor winding 24, which constitutes the field winding of the generator 10, may be arranged in any suitable manner in the slots of the rotor, usually being arranged in concentric, multi-turn coils to form either two or four magnetic poles. The winding 24 is constituted of copper conductors 26 which extend longitudinally through the slots of the rotor body and generally circumferentially in the end turn portions 28, which lie beyond the ends of the body portion 22 of the rotor and which are supported against rotational forces by a heavy retaining ring 30 at each end in the usual manner. As seen in FIGS. 2 and 4, the conductors 26 of which the winding 24 is composed are preferably hollow conductors having central passages 32 extending through them through which the coolant liquid can flow from one end of the conductor to the other, although separate tubes or other duct means in good thermal relation to the conductors could, of course, be used. Any suitable or desired type of flow pattern may be utilized for the coolant, and any desired type of electrical circuit may be used.

The coolant liquid, preferably water, may be supplied to the winding conductors 26 and discharged therefrom in any desired manner, a preferred arrangement being shown, for example, in U.S. Pat. No. 3,733,502 to L.P. Curtis et al. As there more fully disclosed, water is introduced into the winding by means of tubular conduits 34 disposed in slots in the rotor shaft 23 and connected to the end turn portions 28 of the winding to supply coolant to the passages 32. Similar means may be provided at the opposite end of the rotor for discharging water from the conductors. As also disclosed in the above-mentioned Curtis et al patent, the water may be introduced to the rotor and discharged therefrom through shaft bores and directed to the conduits 34 through radial passages in the rotor and insulating connectors to the individual conduits 34. Any other desired construction may, of course, be used for circulating coolant liquid through the rotor winding, including constructions in which the liquid is supplied and discharged at the same end of the rotor.

It will be evident that with such constructions, a large number of joints are required which must be capable of withstanding the extremely high pressures in the hydraulic system due to rotational forces during normal high speed operation of the rotor. The conductors 26 themselves, which may be copper extrusions of considerable length, may have cracks or undetected inclusions which will permit some leakage of water under the high pressures existing during operation. In view of the large number of joints involved, and the very considerable total length of copper conductors where leaks may occur, it is obvious that even with the exercise of all possible precautions during manufacture and inspection, there is some finite probability that a leak in the hydraulic system may occur during operation. If such a leak should occur without any provision for controlling it, a high pressure jet of water could be discharged from the rotor at high velocity with very serious consequences to the stator core on which the jet might impinge, or on the stator winding in or beyond the core. A high pressure water jet of this kind could dangerously erode the core, or it could cut through the high voltage stator winding insulation very quickly, resulting in a catastrophic failure of the machine.

In order to prevent such possibilities, the present invention provides means for collecting and removing any leakage that may occur in a safe manner which prevents any damage to the machine. For this purpose, longitudinal passages are provided at the top of each slot of the rotor. As shown in FIG. 4, each slot 36 is lined by the usual insulating slot cell 38 which insulates the conductors 26 from ground. The conductors 26 are disposed in the slot 36 in the usual manner to form a multi-turn coil and are retained in position by a wedge 40 which may be of usual type. A top insulation channel 42 is normally required for electrical creepage and this channel is assembled with its legs on the outside of the slot cell 38, so as to form longitudinal passages 44 at both upper corners of the slot. These longitudinal passages extend from end to end of the slot and are provided in all of the slots of the rotor. In some cases, such as in very long rotors, the top channel 42 cannot be made as a single member and several abutting sections may be required. In this case, a continuous metallic liner 46 is provided for the channel 42, as shown in FIG. 5, so that the longitudinal passages formed by the top channel 42 have no joints which could themselves constitute leaks. FIG. 5 also shows another modification. If the passages 44 formed in the manner shown in FIG. 4 cannot be made of adequate cross-sectional area, the upper corners of the top conductor 26 may be beveled or grooved as indicated at 48 to provide longitudinal passages of adequate size.

It will be seen that if any leakage occurs within a slot 36 such as may result from a crack or inclusion within a copper conductor, or from a defective joint, such leakage will flow radially outward under the influence of the centrifugal force and up the legs of the slot cell 38 into the longitudinal passages at the top of the slot. At this point the leakage is forced axially toward the retaining ring 30 at one end of the rotor because of the hydrostatic pressure generated by the centrifugal force field. The leakage accumulating in the longitudinal passages, therefore, flows to the end of the rotor where it can be collected and removed.

At each end of the rotor body 22 the slots 36 extend under the end of the retaining ring 30 which overlaps the rotor body. As shown in FIG. 3, each retaining ring 30 has an insulating liner 50 of usual type. An annular groove 52 is provided in the liner 50 extending circumferentially around the retaining ring and positioned to overlap the ends of the slot cells 38 and 42 which may extend beyond the slots 36. Any leakage liquid flowing through the longitudinal passages 44 in the slots, therefore, reaches the circumferential groove 52 and is collected therein. In order to drain the leakage liquid from the groove 52, at least one and preferably several longitudinal grooves 54 are provided in the liner 50 of the retaining ring. These grooves, as seen in FIG. 3, preferably increase in depth from the inner end to the outer end of the retaining ring so that an additional draining force exists causing the liquid to flow to the outer end of the retaining ring and insuring that the groove will drain completely without building up a layer of water. One or more additional circumferential grooves 36 are preferably also provided at suitable positions in the liner 50 intersecting the grooves 54. The grooves 52 and 56 are thus positioned to collect any leakage occurring in the end turn portions 28 of the winding or in the connections thereto, as well as leakage from the slots 36. Such leakage accumulates in the grooves 52 and 56 and is directed to the longitudinal drainage grooves 54 to be drained to the end of the rotor.

It will be seen, therefore, that the rotor has a leakage collection system comprising a series of passages and grooves which collects any leakage liquid occurring in the rotor winding and directs it to the end of the retaining ring. It will also be noted that the passages and grooves at the end of the rotor are formed in the insulating liner 50 and not in the retaining ring itself. Thus, the retaining ring, which is already highly stressed, is not affected by grooves which might cause further stresses or weaken the ring, and is protected from corrosive effects of the water.

At the outer end of the retaining ring 30, an annular end plate 58 of usual type is attached to the retaining ring. The end plate 58 has an annular groove 60 therein which forms a trough disposed at the proper radial position for the longitudinal grooves 54 to extend into the groove 60. Leakage liquid flowing through the grooves 54 is, therefore, discharged into the collection trough 60. A series of axial holes 62 communicating with the trough 60 extends through the end plate 58 to the outside so that any liquid collecting in the trough 60 is discharged through these holes as a fine spray. The holes 62 are shown in FIG. 3 as extending parallel to the axis but it will be apparent that, if desired, they could be inclined radially outward to provide additional drainage force, or could communicate with radial holes for discharge of the liquid if desired. The surfaces of the end plate 58 which are exposed to the liquid should preferably be coated with a suitable protective varnish to prevent corrosion.

The leakage liquid is discharged from the rotor in the form of a fine spray which may be collected in any desired manner. As shown in FIG. 1, a generally circular stationary baffle 64 may enclose the end of the rotor in position to receive this liquid. The baffle 64 may be supported in the housing 14 in any desired manner, and is preferably of generally conical configuration so that any liquid received in the baffle flows toward the bottom of the housing. Liquid flowing from the baffle 64 may be collected in a suitable sump, or other portion of the housing 14, where its presence may be detected by any desired type of detector, and where a suitable drain or other means for disposing of the liquid may be provided.

It should now be apparent that a water cooled rotor has been provided for large turbine generators in which provision is made for preventing any damage due to leaks which may occur in the hydraulic system of the rotor. This is done by providing means for collecting such leakage and draining it to the end of the rotor where it can be discharged and removed in a manner which prevents any risk of damage to the machine. Thus, the risk of dangerous failures or serious damage which necessarily results from the use of a hydraulic system on a rotor revolving at high speed is minimized and substantially avoided. Although certain specific embodiments of the invention have been shown and described for the purpose of illustration, it will be understood that various other modifications and embodiments are possible and are within the scope of the invention.

What is claimed is:

1. In a dynamoelectric machine having stator and rotor members, said rotor member having winding conductors disposed in longitudinal slots and means for circulating coolant liquid in thermal relation with said conductors, means on the rotor for receiving any leakage of said liquid and directing the leakage liquid to one end of the rotor, means for discharging liquid from said end of the rotor, and means on the stator member for receiving liquid discharged from the rotor.

2. The combination of claim 1 in which the last-mentioned means comprises a circular baffle encircling the end of the rotor to receive said liquid and drain it off.

3. The combination of claim 1 in which said rotor includes a retaining ring at said end, and a series of passages and grooves in said slots and retaining ring for receiving leakage liquid and directing it to the end of the retaining ring.

4. The combination of claim 3 and including means at the end of the retaining ring for receiving said leakage liquid and discharging it from the rotor.

5. A rotor for a dynamoelectric machine comprising a body portion having longitudinal slots therein, winding conductors in said slots including duct means for circulation of a coolant liquid, means in each slot providing a passage extending longitudinally to the end of the slot, a retaining ring at the end of said body portion, means on said retaining ring for collecting leakage liquid flowing in any of said passages, means on the retaining ring for directing said leakage liquid to the end of the retaining ring remote from the body portion, and means for discharging said liquid from the rotor.

6. A rotor as defined in claim 5 in which the retaining ring overlaps the ends of the slots, and said leakage liquid collecting means comprises an annular groove on the inner surface of the retaining ring communicating with all of said passages.

7. A rotor as defined in claim 6 in which said directing means for leakage liquid comprises at least one longitudinal groove on the inner surface of the retaining ring communicating with said annular groove.

8. A rotor as defined in claim 7 in which said conductors have end portions outside the slots extending under the retaining ring to be supported thereby, and at least one additional annular groove on the inner surface of the retaining ring intersecting said longitudinal grooves, the annular grooves and longitudinal grooves being positioned to collect any leakage liquid from said end portions of the winding conductors.

9. A rotor as defined in claim 5 and including an end plate at the end of the retaining ring, said end plate having means for receiving liquid from the retaining ring and having means for discharging said liquid.

10. A rotor as defined in claim 5 and including an end plate at the end of the retaining ring, said end plate having an annular groove therein positioned to receive liquid from the retaining ring, and the end plate having a plurality of discharge holes for discharging said liquid therefrom.

* * * * *